No. 756,979. PATENTED APR. 12, 1904.
C. G. PERKINS.
HANDLE FOR ROTARY SNAP ELECTRIC SWITCHES.
APPLICATION FILED OCT. 29, 1903.
NO MODEL.
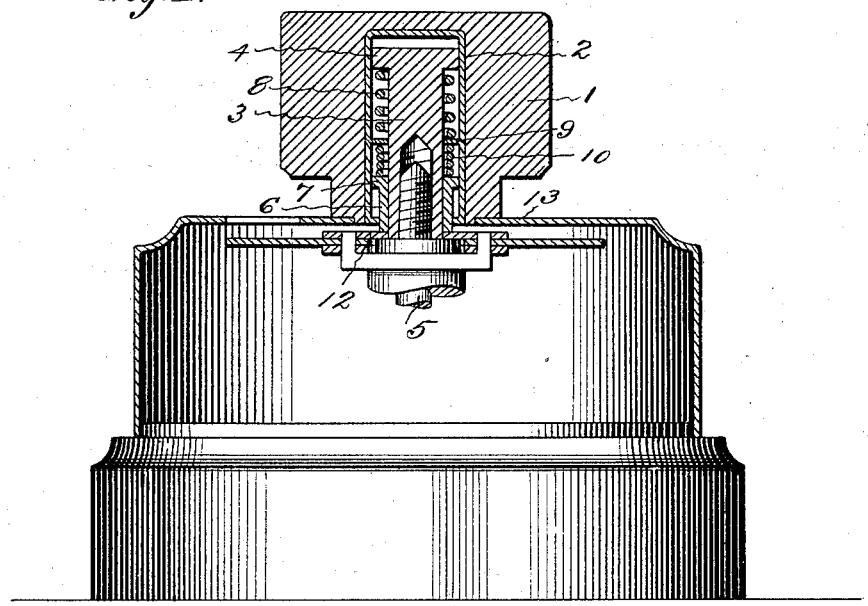
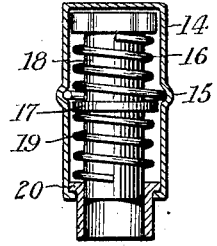 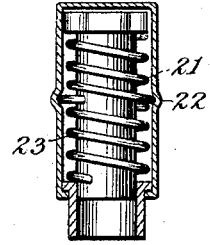 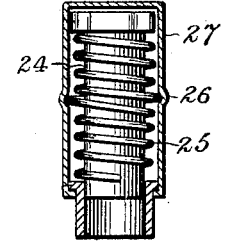
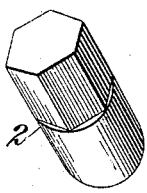 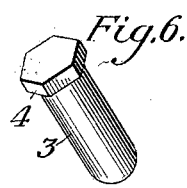 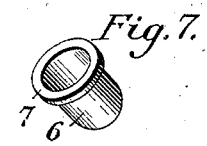
Witnesses:
Frank G. Campbell.
Ethel M. Lowe.
Inventor:
Charles G. Perkins, by
Harry R. Williams
Atty No. 756,979. Patented April 12, 1904.

UNITED STATES PATENT OFFICE.

CHARLES G. PERKINS, OF HARTFORD, CONNECTICUT.

HANDLE FOR ROTARY SNAP ELECTRIC SWITCHES.

SPECIFICATION forming part of Letters Patent No. 756,979, dated April 12, 1904.

Application filed October 29, 1903. Serial No. 178,981. (No model.)

*To all whom it may concern:*

Be it known that I, CHARLES G. PERKINS, a citizen of the United States, residing at Hartford, in the county of Hartford and State of Connecticut, have invented certain new and useful Improvements in Handles for Rotary Snap Electric Switches, of which the following is a specification.

It is common to make handles for rotary snap electric switches with yielding means for attaching the handles to the spindles or sleeves on the spindles supporting the actuating mechanisms for the purpose of holding the covers or plates tightly in position by the handles.

This invention relates to a handle which has a yielding attaching means for such purpose.

The object of this invention is to provide a handle of this nature with a yielding attaching means which will hold an indicating-dial in position as well as the cover or plate.

The handle which embodies this invention has a yielding part adapted to be connected with the spindle so that the handle will bear against and hold the cover or plate with a yielding force and a yielding part that when the handle is attached to the spindle bears against and holds the indicating-dial with a yielding force.

Figure 1 of the accompanying drawings shows a section of a handle that embodies the invention and a cover and dial held in place by the handle, all of the switch mechanisms except the spindle and pole-carrying sleeve being omitted. Fig. 2 is a section showing a modified arrangement of attaching means. Fig. 3 is a section showing another modification, and Fig. 4 is a section showing still another modification. Fig. 5 is a perspective view of the thimble of the form that is shown in Fig. 1. Fig. 6 is a perspective view of the block that moves in the thimble. Fig. 7 is a perspective view of the collar that is held in the lower end of the thimble.

The body 1 of the handle may be made any size and shape of any suitable material, such as rubber composition or porcelain. In the body is an angular thimble 2. The body is preferably molded about this thimble when first formed, so that the thimble will not rotate independently of the body, although, of course, the thimble may, if desired, be inserted after the body has been formed. In the thimble is a block 3, with a head 4 at one end that fits the thimble, so that the thimble and block will rotate together with the body of the handle. The opening in the block is threaded, so that it may be screwed upon the threaded end of the spindle 5. Movable on the outer end of the block in the thimble is a collar 6. This collar preferably has a head 7, that fits the interior of the thimble, and the end of the thimble is turned in to prevent the removal of the collar from the thimble. The block is normally drawn in and the collar is normally thrust out of the thimble by spring-pressure. In the first form shown a spring 8 thrusts between the head of the block and a ring 9 on the inside of the thimble and holds the block in, and a spring 10 thrusts between the head of the collar and the ring and forces the collar outwardly. In the form shown in Fig. 2 the thimble 14 has a recess 15, into which the lower end of the spring 16 expands, so that the spring will thrust between the head of the block and the wall of this recess. In this form the ring 17 is attached to the block 18 and the spring 19 thrusts between the ring and the head of the collar 20. In the form shown in Fig. 3 the spring 21 has its lower end expanded into a recess 22 and the spring 23 is arranged to thrust directly against the end of the spring 21. In Fig. 4 the springs 24 and 25 are shown as formed of one piece of wire, the central portion of which is made larger, so as to expand into the recess 26 in the thimble 27. When the block is attached to the end of the spindle, the collar bears against the outer face of the dial 12 and holds it in place with a yielding pressure, and the inner end of the handle engages the face of the cover 13. As the block is screwed onto the spindle the collar yields and moves into the thimble and the block is drawn out of the thimble, the springs yielding to allow this.

By means of this invention an indicating-dial is tightly held to the spindle-sleeve or spindle with a yielding pressure, and the cover is also tightly held with a yielding pressure. The springs yield so that there is no binding of the parts and allow for all variation of distance between the dial and the cover or variation in the distance of the face of the cover from the face of the base.

The invention claimed is—

1. A handle for a rotary snap electric switch having a recess containing a part that is longitudinally movable in the recess and is adapted to be connected with the switch-spindle, a part that is also longitudinally movable in the recess and is adapted to thrust against a part to be held outside the recess, and yielding means thrusting the two longitudinally-movable parts in opposite directions, substantially as specified.

2. A handle for a rotary snap electric switch having a longitudinally-movable block, a yielding connection between the handle and the block, a longitudinally-movable collar, and a yielding connection between the handle and the collar, substantially as specified.

3. A handle for a rotary snap electric switch having a thimble fixed with relation to the body, a block fitting and longitudinally movable in the thimble, a yielding connection between the thimble and the block, a collar longitudinally movable in the thimble, and a yielding connection between the collar and the thimble, substantially as specified.

4. A handle for a rotary snap electric switch having a thimble fixed with relation to the body, a longitudinally-movable block in but non-rotatable with relation to thimble, a spring holding the block inwardly, a collar movable in the thimble, and a spring thrusting the collar outwardly, substantially as specified.

5. A handle for a rotary snap electric switch having a thimble fixed with relation to the body, a block movable longitudinally in the thimble, a collar movable longitudinally in the thimble, and means thrusting the block and collar in opposite directions, substantially as specified.

CHARLES G. PERKINS.

Witnesses:
HARRY R. WILLIAMS,
ETHEL M. LOWE.